United States Patent
Massimino (10) Patent No.: US 8,929,459 B2
(45) Date of Patent: Jan. 6, 2015

(54) SYSTEMS AND METHODS UTILIZING EFFICIENT VIDEO COMPRESSION TECHNIQUES FOR BROWSING OF STATIC IMAGE DATA

(75) Inventor: Pascal Massimino, Orsay (FR)

(73) Assignee: Google Inc., Mountain View, CA (US)

( * ) Notice: Subject to any disclaimer, the term of this patent is extended or adjusted under 35 U.S.C. 154(b) by 468 days.

(21) Appl. No.: 13/247,917

(22) Filed: Sep. 28, 2011

(65) Prior Publication Data

US 2012/0076210 A1    Mar. 29, 2012

Related U.S. Application Data

(60) Provisional application No. 61/387,317, filed on Sep. 28, 2010.

(51) Int. Cl.
*H04N 7/12* (2006.01)
*H04N 21/2343* (2011.01)
*H04N 21/4782* (2011.01)
*H04N 21/6379* (2011.01)
*H04N 21/658* (2011.01)
*H04N 21/81* (2011.01)

(52) U.S. Cl.
CPC ... *H04N 21/234336* (2013.01); *H04N 21/4782* (2013.01); *H04N 21/6379* (2013.01); *H04N 21/6581* (2013.01); *H04N 21/8153* (2013.01)
USPC ............ 375/240.25; 375/240.01; 375/240.26; 375/240.27; 375/240.28; 375/240.29

(58) Field of Classification Search
CPC .................. H04N 21/234336; H04N 21/4782; H04N 21/8253; H04N 21/6581; H04N 21/6379; H04N 7/50; H04N 7/26335; H04N 7/26707; H04N 7/26946; H04N 7/26244; H04N 19/002; H04N 19/00533
USPC ...................................................... 375/240.25
See application file for complete search history.

(56) References Cited

U.S. PATENT DOCUMENTS 5,481,297 A * 1/1996 Cash et al. ................. 348/14.12
5,517,246 A * 5/1996 Suzuki ....................... 348/412.1

(Continued)

FOREIGN PATENT DOCUMENTS

EP       1 903 698 A2    3/2008
WO    WO 2009066284 A2 *  5/2009 ............. H04N 11/02

OTHER PUBLICATIONS

Sarkar et al, Modeling Full-Length Video Using Markov-Modulated Gamma-Based Framework, 2001.*

(Continued)

*Primary Examiner* — Andy Rao
*Assistant Examiner* — Shan Elahi
(74) *Attorney, Agent, or Firm* — Young Basile Hanlon & MacFarlane P.C.

(57) ABSTRACT

Embodiments include systems and methods that use video compression techniques when browsing web pages referencing static image data or video content. In non-limiting examples, this can include using modern video compression techniques when browsing web pages referencing compressed static image data to obtain increased efficiency in transmission and/or rendering of the static image data on a browser at a client device. In an embodiment, a system includes a browser that browses a received web page having a content identifier and an associated video compression data signature. The browser includes a decoder that decodes compressed video content associated with the content identifier in accordance with a type of video compression identified by the video compression data signature to obtain static image data.

20 Claims, 4 Drawing Sheets (56) References Cited

U.S. PATENT DOCUMENTS

| | | | |
|---|---|---|---|
| 5,539,908 A * | 7/1996 | Chen et al. ............... 719/331 |
| 5,589,945 A | 12/1996 | Abecassis |
| 5,659,539 A | 8/1997 | Porter et al. |
| 5,696,869 A | 12/1997 | Abecassis |
| 5,767,987 A | 6/1998 | Wolff et al. |
| 5,793,647 A | 8/1998 | Hageniers et al. |
| 5,822,465 A * | 10/1998 | Normile et al. ............ 382/253 |
| 5,828,370 A | 10/1998 | Moeller et al. |
| 5,870,754 A * | 2/1999 | Dimitrova et al. ............... 1/1 |
| 5,903,264 A | 5/1999 | Moeller et al. |
| 5,930,493 A | 7/1999 | Ottesen et al. |
| 5,963,203 A | 10/1999 | Goldberg et al. |
| 5,973,696 A * | 10/1999 | Agranat et al. ............ 715/760 |
| 6,014,706 A | 1/2000 | Cannon et al. |
| 6,031,939 A * | 2/2000 | Gilbert et al. ............. 382/239 |
| 6,112,234 A | 8/2000 | Leiper |
| 6,119,154 A | 9/2000 | Weaver et al. |
| 6,185,363 B1 | 2/2001 | Dimitrova et al. |
| 6,195,692 B1* | 2/2001 | Hsu ............... 725/110 |
| 6,208,765 B1 | 3/2001 | Bergen |
| 6,212,302 B1* | 4/2001 | Honsinger et al. ............ 382/232 |
| 6,252,544 B1* | 6/2001 | Hoffberg ............... 342/357.31 |
| 6,256,423 B1 | 7/2001 | Krishnamurthy et al. |
| 6,285,804 B1 | 9/2001 | Crinon et al. |
| 6,292,837 B1 | 9/2001 | Miller et al. |
| 6,349,151 B1* | 2/2002 | Jones et al. ............... 382/251 |
| 6,349,154 B1 | 2/2002 | Kleihorst |
| 6,356,545 B1* | 3/2002 | Vargo et al. ............... 370/355 |
| 6,356,589 B1* | 3/2002 | Gebler et al. ............. 375/240.1 |
| 6,434,197 B1 | 8/2002 | Wang et al. |
| 6,538,698 B1 | 3/2003 | Anderson |
| 6,628,845 B1 | 9/2003 | Stone et al. |
| 6,650,704 B1 | 11/2003 | Carlson et al. |
| 6,654,418 B2 | 11/2003 | Haskell et al. |
| 6,754,181 B1* | 6/2004 | Elliott et al. ............... 370/252 |
| 6,810,149 B1 | 10/2004 | Squilla et al. |
| 6,907,079 B2 | 6/2005 | Gomila et al. |
| 7,130,472 B2* | 10/2006 | Iizuka et al. ............... 382/236 |
| 7,218,674 B2 | 5/2007 | Kuo |
| 7,263,125 B2 | 8/2007 | Lainema |
| 7,403,662 B2 | 7/2008 | Mitchell et al. |
| 7,415,662 B2 | 8/2008 | Rothmuller et al. |
| 7,602,997 B2 | 10/2009 | Young |
| 7,627,227 B2* | 12/2009 | Evans et al. ............... 386/347 |
| 8,045,480 B2* | 10/2011 | Ganesamoorthi et al. ..... 370/252 |
| 8,359,656 B2 | 1/2013 | Kellerman et al. |
| 8,508,651 B2 | 8/2013 | Tsubaki et al. |
| 2001/0055336 A1* | 12/2001 | Krause et al. ............. 375/240.11 |
| 2002/0026639 A1 | 2/2002 | Haneda |
| 2002/0033844 A1* | 3/2002 | Levy et al. ............... 345/744 |
| 2002/0062482 A1* | 5/2002 | Bolle et al. ............... 725/105 |
| 2002/0071485 A1 | 6/2002 | Caglar et al. |
| 2002/0097917 A1* | 7/2002 | Nelson et al. ............... 382/239 |
| 2003/0025648 A1* | 2/2003 | Glen et al. ............... 345/2.3 |
| 2003/0133501 A1* | 7/2003 | Ueda et al. ............... 375/240.13 |
| 2003/0142872 A1* | 7/2003 | Koyanagi ............... 382/236 |
| 2003/0154190 A1 | 8/2003 | Misawa et al. |
| 2003/0174217 A1 | 9/2003 | Kito et al. |
| 2003/0189652 A1 | 10/2003 | Takayama |
| 2003/0215011 A1* | 11/2003 | Wang et al. ............. 375/240.03 |
| 2003/0215018 A1 | 11/2003 | MacInnis et al. |
| 2004/0066968 A1* | 4/2004 | Glickman ............... 382/166 |
| 2004/0100505 A1 | 5/2004 | Cazier |
| 2004/0172440 A1 | 9/2004 | Nakajima et al. |
| 2004/0220791 A1* | 11/2004 | Lamkin et al. ............... 703/11 |
| 2004/0220926 A1* | 11/2004 | Lamkin et al. ............... 707/3 |
| 2005/0018768 A1* | 1/2005 | Mabey et al. ............ 375/240.2 |
| 2005/0050002 A1* | 3/2005 | Slotznick ............... 707/1 |
| 2005/0050043 A1 | 3/2005 | Pyhalammi et al. |
| 2005/0192924 A1 | 9/2005 | Drucker et al. |
| 2005/0193408 A1* | 9/2005 | Sull et al. ............... 725/32 |
| 2005/0204041 A1* | 9/2005 | Blinn et al. ............... 709/225 |
| 2005/0210145 A1* | 9/2005 | Kim et al. ............... 709/231 |
| 2005/0216186 A1 | 9/2005 | Dorfman et al. |
| 2005/0220352 A1 | 10/2005 | Wemelsfelder |
| 2005/0276323 A1 | 12/2005 | Martemyanov et al. |
| 2006/0028399 A1* | 2/2006 | Glen et al. ............... 345/2.3 |
| 2006/0047967 A1* | 3/2006 | Akhan et al. ............... 713/176 |
| 2006/0090141 A1 | 4/2006 | Loui et al. |
| 2006/0098738 A1 | 5/2006 | Cosman et al. |
| 2006/0195881 A1* | 8/2006 | Segev et al. ............... 725/116 |
| 2006/0200475 A1 | 9/2006 | Das et al. |
| 2007/0025441 A1 | 2/2007 | Ugur et al. |
| 2007/0177673 A1 | 8/2007 | Yang |
| 2008/0049971 A1* | 2/2008 | Ramos et al. ............... 382/100 |
| 2008/0168489 A1* | 7/2008 | Schraga ............... 725/32 |
| 2009/0138484 A1* | 5/2009 | Ramos et al. ............... 707/10 |
| 2010/0023979 A1* | 1/2010 | Patel et al. ............... 725/93 |
| 2010/0042747 A1* | 2/2010 | Hascalovici et al. ......... 709/246 |
| 2010/0067822 A1 | 3/2010 | Young |
| 2010/0070608 A1 | 3/2010 | Hosur |
| 2010/0086028 A1 | 4/2010 | Tanizawa et al. |
| 2010/0118945 A1 | 5/2010 | Wada et al. |
| 2011/0211637 A1* | 9/2011 | Blum ............... 375/240.16 |
| 2011/0264676 A1 | 10/2011 | Belan et al. |
| 2012/0201475 A1 | 8/2012 | Carmel et al. |

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Fan. Z., & de Queiroz, R.L. (Feb. 2003). Identification of bitmap compression history: JPEG detection and quantizer estimation. IEEE Transactions on Image Processing, 12(2), 230-5. doi:http://dx.doi.org/10.1109/TIP.2002.807361.

(56) References Cited

OTHER PUBLICATIONS

The International Search Report and the Written Opinion of the International Searching Authority, International Application No. PCT/US2011/053460, mailed on Dec. 16, 2011, 12 pages.
Non-Final Office Action mailed Nov. 6, 2013, in co-pending U.S. Appl. No. 13/247,920, 19 pp.
Final Office Action mailed Feb. 11, 2014, in co-pending U.S. Appl. No. 13/247,920, 16 pp.
Wikipedia, the free encyclopedia, "Graphics Interchange Format", downloaded Jun. 24, 2014, 15 pp, http://en.wikipedia.org/w/index.php?title=Graphics_Interchange_Format&oldid=379610957.
Wikipedia, the free encyclopedia, "JPEG", downloaded Jun. 24, 2014, 15 pp, http://en.wikipedia.org/w/index.php?title=JPEG&oldid=387366433.
Wikipedia, the free encyclopedia, "Motion JPEG", downloaded Jun. 24, 2014, 5 pp, http://en.wikipedia.org/w/index.php?title=Motion_JPEG&oldid=386187797.
Wikipedia, the free encyclopedia, "Portable Network Graphics", downloaded Jun. 24, 2014, 19 pp, http://en.wikipedia.org/w/index.php?title=Portable_Network_Graphics&oldid=386636989#Animation.

* cited by examiner

SYSTEMS AND METHODS UTILIZING EFFICIENT VIDEO COMPRESSION TECHNIQUES FOR BROWSING OF STATIC IMAGE DATA

CROSS REFERENCE TO RELATED APPLICATION(S)

This application claims priority to U.S. Provisional Patent Application No. 61/387,317, filed Sep. 28, 2010.

FIELD

The field relates to browsing image data for display.

RELATED ART

A variety of media content including image and video data is now made available to users at client devices. The emergence and development of computer networks and protocols, including the World Wide Web (or simply "web"), has allowed many users to view and enjoy media content served from remote locations over the web. A user at a client device operates a browser. The browser (also called a client browser) is coupled over one or more networks, such as the Internet, to a web server. The web server in turn can be part of or coupled to another server (such as a media streaming server). Depending upon a particular application or content being viewed, the web server and/or the media server can serve media content to the browser on a client device for display or viewing by the user.

Compression is often used in the case of image data and video data to reduce the amount of data that needs to be transmitted over a network. A variety of different types of compression and file formats have been developed and used over the years. For instance, static images (also called pictures) have long been compressed and sent in a file format as GIF, PNG or JPEG files. Video has been compressed according to a number of different video compression techniques and standards, such as, H.261, H.262, MPEG I-part 2, MPEG 2-part 4, or H.263 video compression. Newer video compression techniques and standards have been developed as well to compress video. These newer video compression techniques (also called modern techniques) include for example MPEG 4 AVC/H.264, VC-1, On2 VP6-VP8 video compression.

When browsing a web page, a browser often identifies a file and requests the file from a remote server. The browser then receives the requested file and renders it for display depending upon its file format and type of compression used to create the file. For instance, static images sent in a file format such as GIF, PNG or JPEG files are received and then decompressed and rendered for display by the browser on a client device according to the file format or tag specified in the web page. Likewise, compressed video files referenced in a web page are fetched by the browser and then decompressed and rendered for display by the browser on a client device according to the file format or tag specified in the web page.

In the case of a static image, a browser requests a compressed static image and has a compressed static image sent over a network even when inefficient.

SUMMARY

Embodiments include systems and methods that use video compression techniques when browsing web pages referencing static image data or video content. In non-limiting examples, this can include using modern video compression techniques when browsing web pages referencing compressed static image data to obtain increased efficiency in transmission and/or rendering of the static image data on a browser at a client device. In further examples, this may include browsing a web page referencing compressed video content and then decoding the referenced compressed video content to obtain static image data for rendering in a browser window.

In an embodiment, a system includes a browser configured to operate on a first computing device and browse a received web page having a video content identifier and an associated video compression data signature. The browser includes a decoder that decodes compressed video content associated with the video content identifier in accordance with a type of video compression identified by the video compression data signature to obtain static image data. The browser renders the obtained static image data for display in a browser window that shows content corresponding to the received web page.

In an embodiment, a method includes receiving, at a computing device having a browser, a web page having a video content identifier and an associated video compression data signature, and recognizing the video compression data signature. The method includes decoding compressed video content associated with the content identifier based on the recognized video compression data signature to obtain static image data, and rendering the obtained static image data for display in a browser window showing content corresponding to the received web page.

In a feature, the video compression data signature identifies a type of video compression more efficient than a type of static image compression. For example, the video compression data signature may identify a type of video compression selected from the group of VP8, H.264/AVC, or VC-1 video compression, while the type of static image compression is a type of compression selected from the group of JPEG, GIF or PNG file or image compression formats.

In an embodiment, the method further includes requesting the compressed video content from a remote site over a network, and receiving the compressed video content from the remote site over a network prior to the decoding.

In another embodiment, recognizing, decoding, and rendering are performed by a browser at the computing device.

In a still further embodiment, a recompressing service is used. In an embodiment, a system includes a browser, configured to operate on a first computing device and browse a received web page having a static image content identifier and an associated static image compression data signature. The browser is further configured to request compressed image content associated with the static image content identifier and receive compressed video content that is a recompression of the requested compressed static image content. The browser includes a decoder that decodes the received compressed video content based on a recognized video compression data signature to obtain static image data. The browser renders the obtained static image data for display in the browser.

In another embodiment, a method includes receiving, at a first computing device having a browser, a web page having a static image content identifier and an associated static image compression data signature, and requesting compressed image content associated with the static image content identifier. The method further includes receiving compressed video content that is a recompression of the requested compressed static image content, and decoding the received compressed video content based on the recognized video compression data signature to obtain static image data. The method then includes a step of rendering the obtained static image data for display in a browser window showing content corresponding to the received web page.

In a feature, the static image content identifier and an associated static image compression data signature are included in a URL in the received web page. In a further feature, the static image compression data signature identifies a type of static image compression and the compressed video content is more efficiently recompressed than the compressed static image content. In a non-limiting example, the compressed video content is recompressed with a type of video compression selected from the group of VP8, H.264, or VC-1 video compression and the compressed static image content is a type of static image compression selected from the group of JPEG, GIF or PNG formats.

In a further embodiment, the method further includes displaying the browser window on a display so a user can view the rendered static image data corresponding to the received web page.

In one example, the computing device requests the compressed image content from a remote site over a network prior to the decoding. In another example the requesting, decoding, and rendering are performed by the browser at the computing device.

In a further example, the method also includes at a remote second computing device coupled to the first computing device over a network, the steps of transcoding the requested compressed image content associated with the static image content identifier to obtain the compressed video content, and sending the compressed video content over the network to the first computing device, whereby the compressed video content is transmitted more efficiently over the network than a transmission of the compressed imaged content.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

Overview and Discussion of Embodiments

By limiting fetching and rendering according to specified types of compression and file formats, browsers often fail to take advantage of more modern compression techniques which can be more efficient. This is especially true when browsing web pages having static image data in older compression formats such as JPEG, GIF, and PNG. While JPEG compression is an ancestor to block-based modern video compression techniques, some substantial improvement in coding efficiency has been made since the 1990s as the more modern video compression techniques use increasingly efficient prediction and/or correction models.

Browsers encountering such older compression formats often request the compressed files over a network which requires transmission and then have to correspondingly decompress the files during rendering to display a static image. Inefficiencies may exist in the transmission and/or rendering—especially when static image files using older compression techniques are involved which is common in many of today's web pages including HTML pages.

In embodiments of the present invention these inefficiencies are reduced. More modern video compression techniques may be used when browsing existing web pages that reference static image data. This is especially important for browsers operating on client devices such as mobile devices, including smartphones, tablet, or laptop computing devices where processing resources or communications resources (e.g. bandwidth or latency) may be limited.

For instance, browsers implementing HTML are still using GIF, PNG and JPEG format for their static images using the image <img> tag. Yet the image tag is not limited to these three image compression standards and the HTML standard is open to any other format. A feature provided here is using known video compression standards as an image format (such as static image or picture image format). These known video compression techniques can include modern video compression techniques more recent than, say, older formats according to the JPEG standard. In one preferred example, modern video compression standards are used to compress static images instead of a collection of frames. This can replace the use of JPEG compressed files, for instance.

As discovered by the inventor, embodiments described herein allow browsers to benefit from these advances in compression technology and make them available for image display too. For instance, the inventor has found in examples that this can save about 10-33% of file size (and bandwidth) on thumbnails, user photos and advertisement banners.

For example, when a browser receives data corresponding to an image data, it looks up few bytes at the beginning of the stream to infer the nature of the compression used. In embodiments of the present invention, a browser recognizes new data signatures corresponding to modern video standards (like AVC/H.264, VC-1, VP8 for instance). The browser recognizes this format and decodes the corresponding video sequence in order to display one or several frame of this video sequence as an image in the web page.

In a further feature, this technique can be used with a recompression service where a browser at a client requests a regular static image (JPEG data) using a URL, but instead receives recompressed bytes supplied by the recompressing service. This service would fetch the JPEG data itself and retranscode it toward a more efficient video format before serving the result to the browser and thereby using less bandwidth. The browser would then decompress this alternate data toward a displayable image samples, or turn the video data back into a standard image format.

In operation, the recompression service may include a transcoder device in charge of converting regular image data like JPEG into video data and serving the video data instead to a requesting consumer device (such as a client computing device with a browser or other client application). The recompression service may carry out the transcoding off-line or on-line. The requesting consumer device would be made aware of the change in data representation and either: decompress the data itself, or request a proxy process to do this decompression, returning the decompressed image samples.

System

Figure 1:
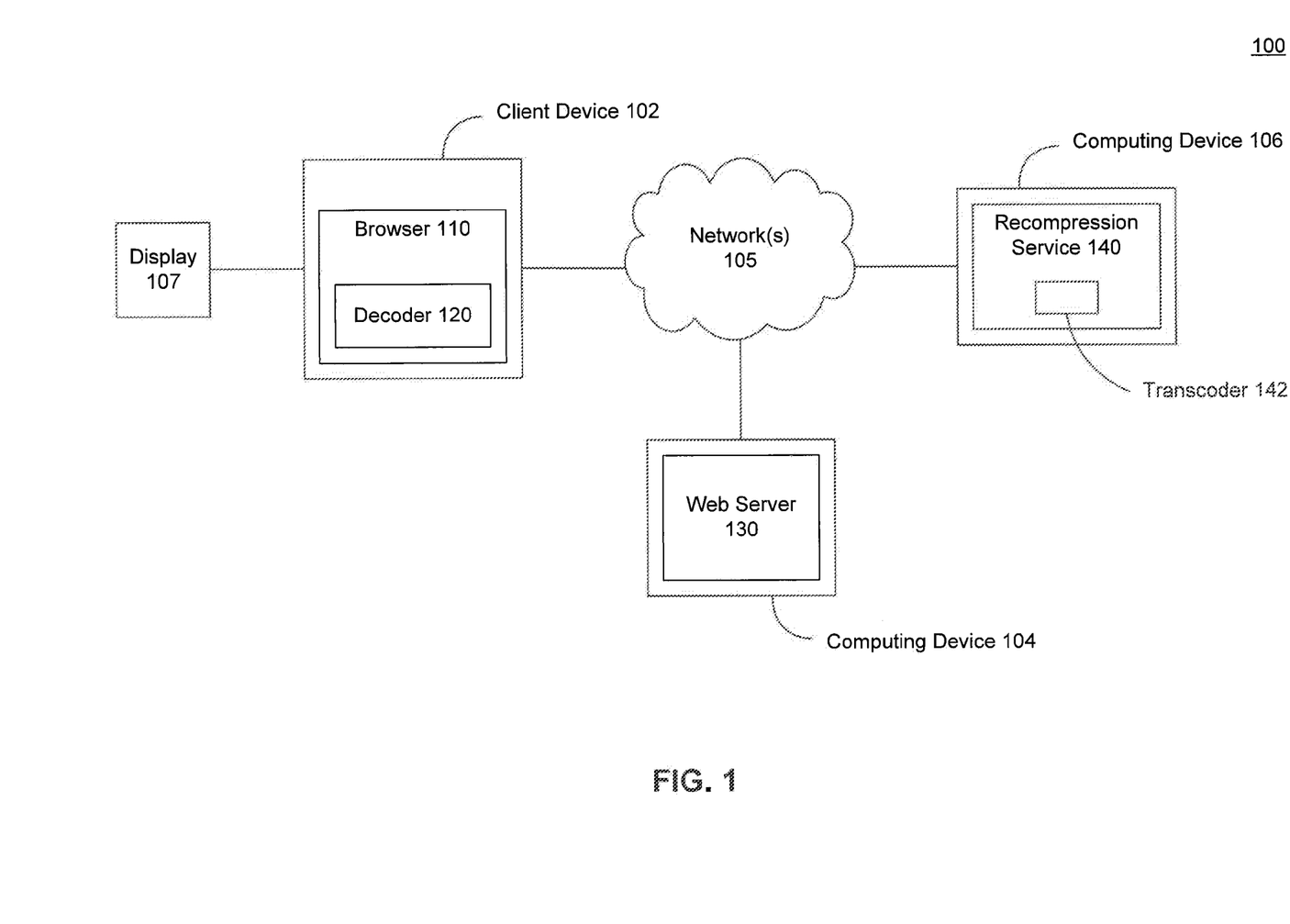
FIG. 1 is a diagram of a system for utilizing video compression techniques when browsing compressed static image data according to an embodiment of the present invention.

FIG. 1 is a diagram of a system 100 for utilizing video compression techniques when browsing compressed static image data according to an embodiment of the present invention. System 100 includes a browser 110 and decoder 120 implemented on a client device 102. Client device 102 also has a display 107 for displaying content browsed by browser 110 to a user.

Client device 102 can be any type of computing device. Example computing devices that may be used include, but are not limited to, a computer, workstation, distributed computing system, computer cluster, embedded system, game console, stand-alone electronic device, networked device, mobile device (e.g., smartphone, tablet, laptop or personal computer), set-top box, television, or other type of processor or computer system having at least a processor and memory. A processor may be a single processor, or part of a plurality of processors, or combinations thereof. A processor may also be in processor devices that may have one or more processor "cores."

System 100 further includes remote computing devices 104 and 106 coupled to client device 102 over one or more networks 105. Network(s) 105 can be any type of data network or combination of data networks (such as the Internet, wide area, medium area or local area network) for carrying data between the computing devices 102, 104 and 106. Network(s) 105 can support protocols and technology including, but not limited to, World Wide Web protocols and/or services. Remote computing devices 104 and 106 may each be any type of computing device including, but not limited to, a computer, workstation, distributed computing system, computer cluster, embedded system, game console, stand-alone electronic device, networked device, mobile device (e.g., smartphone, tablet, laptop or personal computer), set-top box, television, or other type of processor or computer system having at least a processor and memory. A processor may be a single processor, or part of a plurality of processors, or combinations thereof. A processor may also be in processor devices that may have one or more processor "cores."

A web server 130 is implemented on computing device 104. Any type of web server may be used to serve web content to browser 110. In an embodiment, a wet server is a software component that responds to a hypertext transfer protocol (HTTP) request with an HTTP response. As illustrative examples, the web server may be, without limitation, Apache HTTP Server, Apache Tomcat, Microsoft® Internet Information Server, JBoss Application Server, WebLogic Application Server®, or Sun Java™ System Web Server. The web server may serve content such as hypertext markup language (HTML), extendable markup language (XML), documents, videos, images, multimedia features, MACROMEDIA Flash programs, or any combination thereof. These examples are illustrative and do not limit the present invention. Web server 130 can operate alone or in tandem with other servers (such as media servers), web servers, or devices and can be part of any search engine, portal, or web site.

According to a feature browser 110 can browse a web page that references a video compression file, decode the referenced video compression file with decoder 120 to obtain a static image, and render the static image for display. This allows web pages to include references to video compression files in static image sections of a web page denoted by tags such as "img". The references to video compression files can include, but are not limited to, files compressed with modem video compression techniques such as AVC/H.264, or VP8 video compression. The operation of browser 110 according to this feature is described further below with reference to FIG. 2.

According to another feature, a recompression service 140 with a transcoder 142 can be used. Browser 110 can browse a web page that references a static image compression file and have the compressed static image be transcoded by transcoder 142 into a video compression file. The transcoded video compression file is then sent over a network rather than sending the originally requested static image compression file. Decoder 120 decodes the sent video compression file to a static image, and browser 110 renders the static image for display. This can result in efficiencies in network transmission especially when the transcoded video compression file is smaller than the referenced compressed static image in the web page. The operation of browser 110 according to this feature is described further below with reference to FIG. 3.

Figure 4:
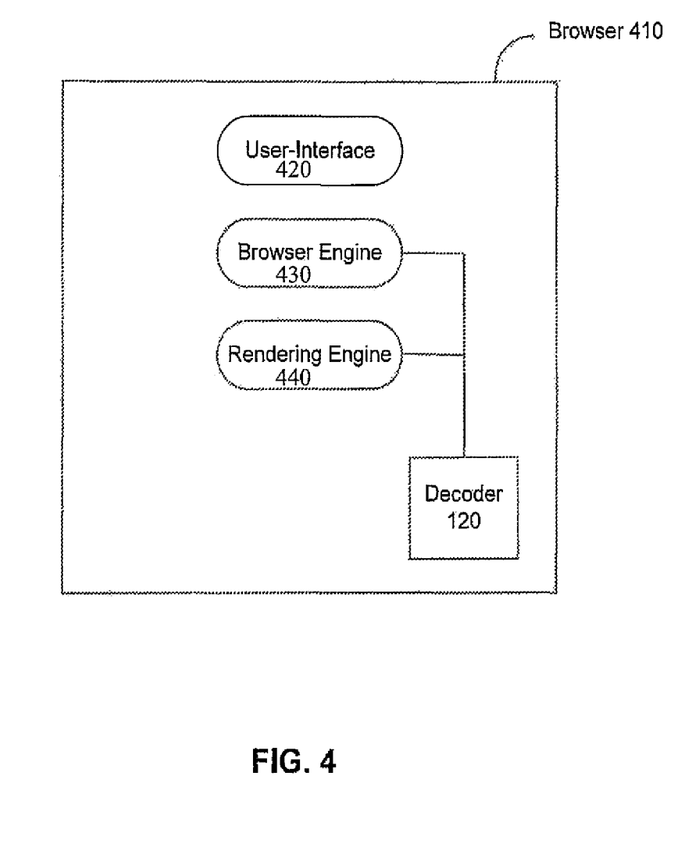
FIG. 4 is a browser implementation that can be used in the system of FIG. 1 and with methods of FIGS. 2 and 3 according to one example.

Browser 110 can be any type of browser including any conventional browser, such as a Google Chrome, Microsoft Internet Explorer, Apple Safari, or Mozilla Firefox browser, modified to operate as described herein. In one example, not intended to be limiting, functionality described herein can be implemented in a Webkit tool suite for use for example in a Google Chrome, Apple Safari, or other browser using the Webkit tool suite. FIG. 4 shows an example of browser 410 that may be used having a user-interface 420, browsing engine 430, and rendering engine 440. Decoder 120 can then be coupled to at least the browsing engine and rendering engine. The user-interface can support interactions with a user and the browser including sending and receiving control commands or data between the browser and a user-interface unit (such as, a touch screen, GUI, voice control, or other 1/0 device). The browsing engine manages and carries out browsing functions. The rendering engine manages and carries out rendering of data for display.

In other examples, decoder 120 is not necessarily part of browser 110 and instead can be a stand-alone module or incorporated in another application on a client or even in a separate remote decompressing service.

In further example arrangements, recompression service 140 with transcoder 142 can be independent of web server 130, or can be part of or integral with web server 130. Recompression service 140 with transcoder 142 can also be locally or remotely coupled to communicate with web server 130.

Browser 110, decoder 120, web server 130, recompression service 140, and transcoder 142 can be implemented in software, hardware, firmware, tangible readable medium having instructions, or any combination thereof on one or more computing devices. In one embodiment, if programmable logic is used, such logic may execute on a commercially available processing platform or a special purpose device. Embodiments also may be directed to computer program products comprising software stored on any computer useable medium. Such software, when executed in one or more data processing device, causes a data processing device(s) to operate as described herein. Embodiments of the invention may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Surfing Video Compression Files with Static Image Display

Figure 2:
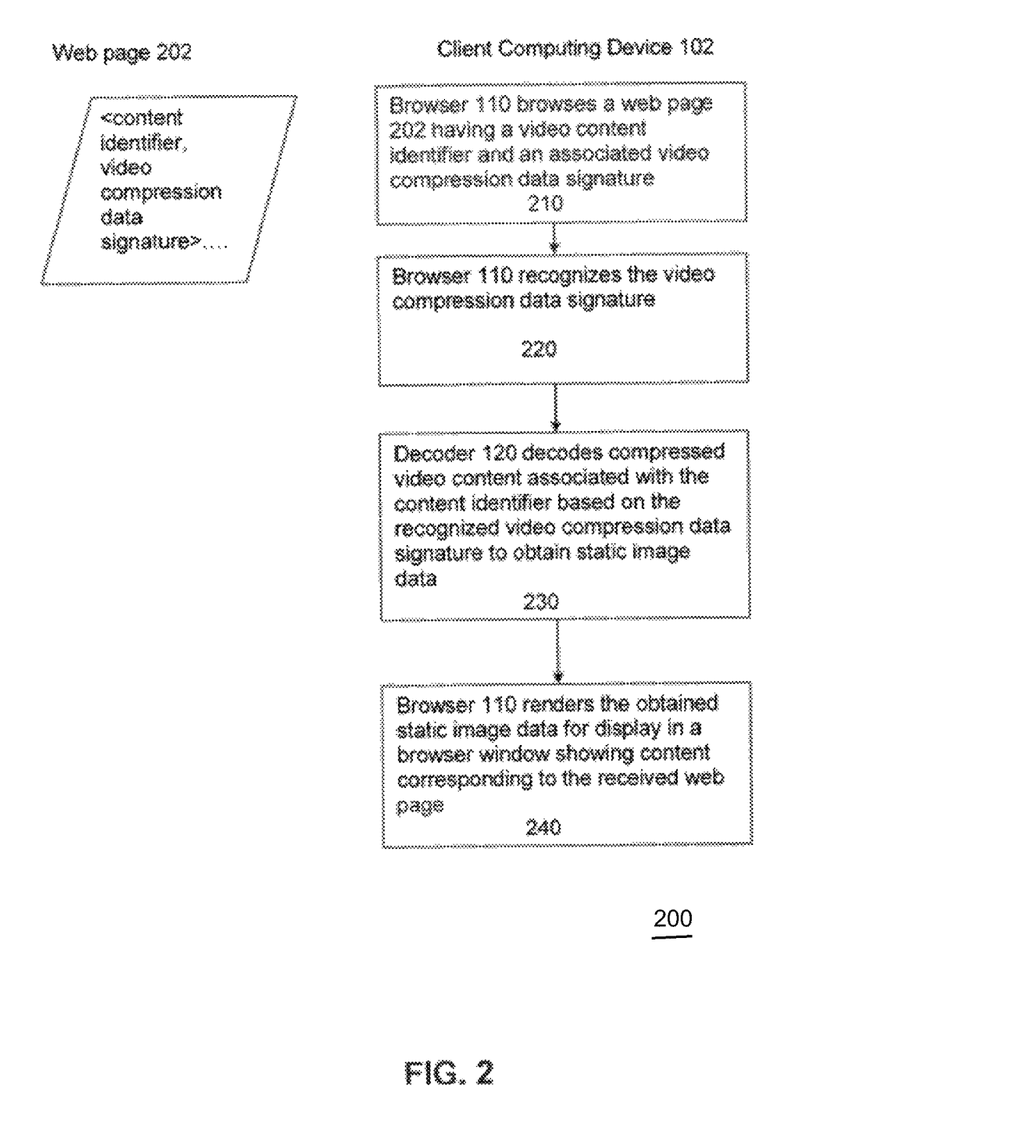
FIG. 2 is a flowchart diagram of a method according to an embodiment of the present invention.

For brevity, the operation of browser 110 and web server 130 is described further with respect to the method 200 of FIG. 2 (steps 210-240). The method 200 of FIG. 2 however is not necessarily limited to the structure or operation of system 100.

According to a feature, browser 110 is configured to operate on client device 102 and browse a web page 202 having a video content identifier and an associated video compression data signature (step 210). In step 220, browser 110 recognizes the video content identifier (such as a filename) and an associated video compression data signature (such as a tag or file name suffix) indicative of a type of video compression or file format.

Browser 110 then obtains a compressed file identified by the video content identifier. This compressed file can be accessed locally from a cache or local memory, if available, or remotely by sending a request (e.g., URL) to web server 130. Web server 130 (or another server such as a media server) then returns the requested compressed video file to fulfill the request made by browser 110.

In step 230, decoder 120 decodes compressed video content associated with the video content identifier in accordance with a type of video compression identified by the video compression data signature to obtain static image data. Browser 110 renders the obtained static image data for display in a browser window on display 107 that shows content corresponding to the received web page (step 240).

In this way, browser 110 displays a static image in a display of a web page even when the web page identified a compressed video file with a type of video compression identified by its video compression data signature. For instance, in one feature example, a web page may include a compressed video file with a video compression data signature indicating a modem video compression technique such as H.264/AVC, VC-1, or VP8 compression. Decoder 120 decodes this compressed video to obtain a static image (or a video frame, such as, a keyframe or other desired frame of a video frame sequence). Browser 110 then renders for display the static image (i.e., the keyframe or other desired frame of a video sequence). This is particularly helpful for display of thumbnails, ads, or other small area content.

For example, the inventor has implemented a Google Chrome browser which can browse an HTML page using syntactic elements like: <img src='video.264'> to display the first frame of the video file 'video.264' compressed using the H.264 video standard ("MPEG-4-part10/AVC").

In a feature, the video compression data signature identifies a type of video compression more efficient than a type of static image compression. For example, the video compression data signature may identify a type of video compression selected from the group of VP8, H.264/AVC, or VC-1 video compression, while the type of static image compression is a type of compression selected from the group of JPEG, GIF or PNG file or image compression formats.

In one embodiment, the method further includes requesting the compressed video content from a remote site over a network, and receiving the compressed video content from the remote site over a network prior to the decoding.

In another embodiment, recognizing, decoding, and rendering are performed by a browser at the computing device.

Surfing Static Image Compression Files with Recompressed Static Image Display

Recompressing Service

In a still further embodiment, a recompressing service 140 is used as shown optionally in FIG. 1. For brevity, the operation of browser 110, web server 130, and recompressing service 140 is described further with respect to the method of FIG. 3 (steps 310-350). The method of FIG. 3 however is not necessarily limited to the structure or operation of system 100.

Figure 3:
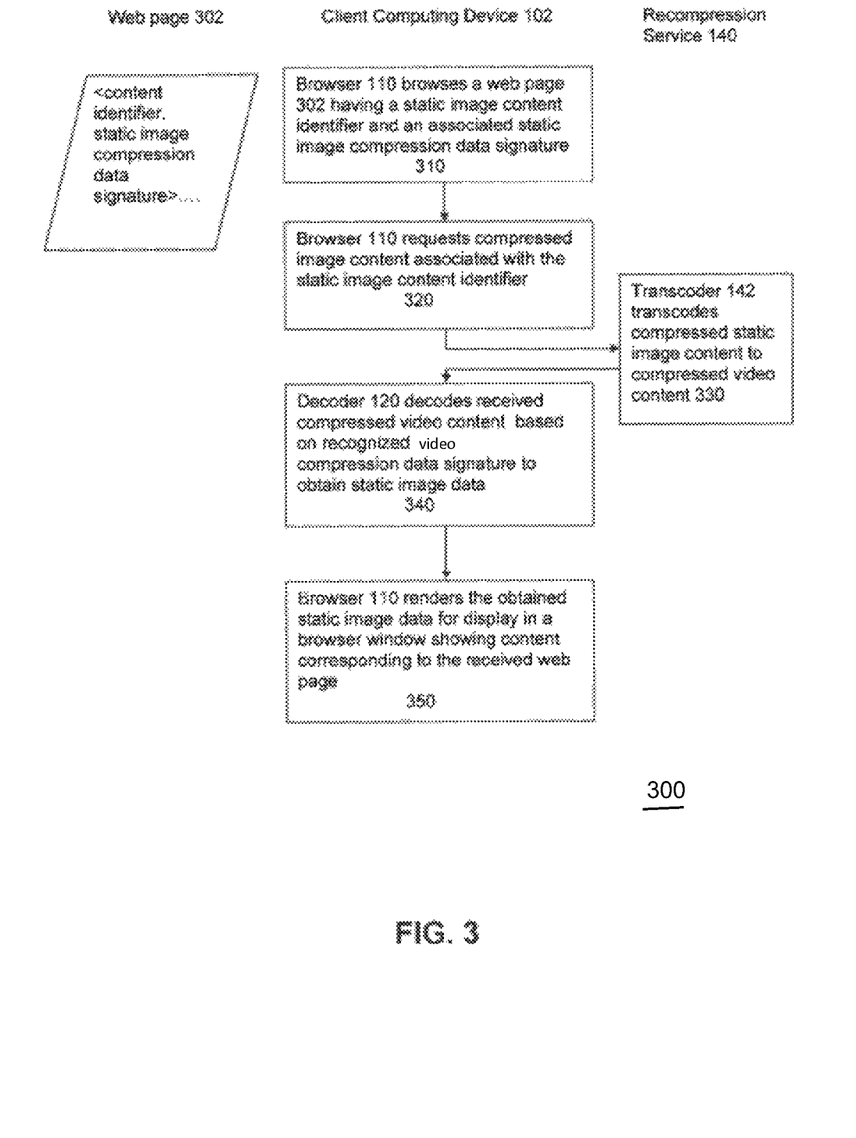
FIG. 3 is a flowchart diagram of a method using a recompression service according to a further embodiment.

In an embodiment, browser 110 browses a received web page 302 having a static image content identifier and an associated static image compression data signature (step 310). Browser 110 requests compressed static image content associated with the static image content identifier (step 320).

As shown in FIG. 3, in another embodiment, a method 300 includes browsing a web page 302 having a static image content identifier and an associated static image compression data signature (step 310). In step 320, compressed image content associated with the static image content identifier is requested of a recompressing service 140 at a remote server. A transcoder 142 transcodes compressed static image content to a compressed video content such as a file (step 330). Recompression service 140 then returns the compressed video content to fulfill the browser 110 request. This can be done directly from the recompression service 140 or through web server 130.

Once recompression is completed or as it occurs in the case of streaming, decoder 120 decodes the received compressed video content based on the recognized video compression data signature to obtain static image data (step 340). Browser 110 then renders the obtained static image data for display in a browser window showing content corresponding to the received web page (step 350).

In other alternative examples, in step 330 recompression service 140 can send transcoded data to another client application or proxy service for decompressing rather the browser 110. For example, transcoder 142 can transcode images in a standard JPEG format toward more efficient compression derived from video compression standard and transmit the resulting bytes not to a browser directly, but to a decoding process (such as one carried out in a Google Toolbar) that will decode the result and transmit the resulting image bytes to the browser directly, on the client's side. In other example, a product such as iGoogle can request transcoding and use Google Toolbar as a decompressing proxy.

Further Examples and Programming Notes

Further examples implementing aspects of system 100 and methods 200 and 300, not intended to be limiting of the present invention, are described below.

Using VP8 as new <img> Format

In one example, system 100 and method 200 may include:
using Google VP8 format for <img> files, mainly to replace JPEG when possible;
using a lightweight VP8 keyframe decoder that works based on the assumption one is only decoding one keyframe; and
extending a Chrome browser with <img src="picture.vp8"> or <video src="picture.vp8">, to further make the Web experience for a user faster.
In one example of a modified Chrome browser, example web pages were obtained with the JPEG images were converted to VP8, reducing size by factor 1.5.
Libraries or other tools may be used to convert data from and to VP8;
A tool may be used to convert PNG or JPEG to VP8 files.

Transcoding

JPEG to Google VP8

In one example, transcoder 142 as described can convert a JPEG (or PNG) to Google VP8. One reason VP8 in an example is better than JPEG is due to mainly the use of spatial intra prediction. The Google VP8 coding may use spatial intra prediction modes (as opposed to the frequency-domain prediction one can find in JPEG/MPEG). Google VP8 examples may also have better coefficient coding, range coding instead of Huffman codes, variable block sizes (16×16/4×4), and two-stage transforms.

Low-Level Encoding and Decoding API

In an example, a simple one-call API may be used to compress and decompress VP8 data from and to raw YUV samples. One can convert between RGB and YUV.

Decoding

Keyframe Decoding

In one example, decoder 120 is a fast H.264 keyframe decoder that works based on the assumption one is only decoding one keyframe. This keyframe decoder example extends a Google Chrome browser with <img src="picture.264"> or <video src="picture.264">, and thereby makes a user experience of web browsing faster.

In another example, a page from YouTube was compared against its H.264 equivalent where all the JPEGs have been converted to H.264 using a constant moderate compression factor and a reduction of about 33% in size was obtained.

CONCLUSION

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method comprising:
   receiving, at a computing device having a browser, a web page that references a static image identifier;
   requesting a static image file identified by the static image identifier from a web server using the browser, the static image identifier indicating that the static image file is encoded using a type of static image compression;
   receiving a compressed video file in response to the request for the static image file;
   recognizing that the compressed video file contains a video compression data signature by examining a plurality of bytes within the received compressed video file; and
   decoding the received compressed video file using a type of video compression identified by the video compression data signature to obtain static image data encoded in the compressed video file.

2. The method of claim 1, wherein the static image identifier is included in a URL within an image tag in the received web page.

3. The method of claim 1, wherein the type of video compression more efficient than a type of static image compression used to encode image data in the static image file.

4. The method of claim 3, wherein the video compression data signature identifies a type of video compression selected from the group of VP8, H.264, and VC-1 video compression.

5. The method of claim 4, wherein the type of static image compression comprises a type of compression selected from the group of JPEG, GIF, and PNG static image compression.

6. The method of claim 1, wherein the decoding the received compressed video file is performed by a client application other than the browser, the client application configured to transmit the decoded static image data to the browser after decoding.

7. The method of claim 1, wherein the decoding the received compressed video file is performed by a keyframe decoder, the keyframe decoder having capability limited to decoding a video keyframe.

8. The method of claim 1, wherein the received compressed video file was transcoded from the requested static image file by a recompression service in response to the request for the static image file.

9. The method of claim 1, wherein the static image data includes a plurality of static images and each of the plurality of static images is rendered for display by the browser.

10. The method of claim 1, further comprising:
    recompressing the decoded static image data using a type of static image compression selected from the group of JPEG, PNG, and GIF.

11. A system comprising:
    a browser, configured to operate on a first computing device and browse a received web page including a static content identifier, the browser further being configured to request static image content associated with the static content identifier that is encoded using a type of static image compression;
    wherein the browser receives, in response to the request, compressed video content that is a video compression of the requested static image content; and
    wherein the browser employs a decoder that decodes the received compressed video content based on a video compression data signature associated with the compressed video content to obtain static image data, the video compression data signature recognized by examining a plurality of bytes within the compressed video content.

12. The system of claim 11, further comprising:
    a client application configured to operate on the first computing device, wherein the decoder employed by the browser is included within the client application and is configured to transmit the decoded static image data to the browser after decoding.

13. The system of claim 11, wherein the decoder is a keyframe decoder, the keyframe decoder having capability limited to decoding a video keyframe.

14. The system of claim 11, wherein the received compressed video content was transcoded from the requested static image content by a recompression service in response to the request for the static image content.

15. The system of claim 11, wherein the static image data includes a plurality of static images and each of the plurality of static images is rendered for display by the browser.

16. The system of claim 11, wherein the decoder is configured to recompress the decoded static image data using a type of static image compression selected from the group of JPEG, PNG, and GIF.

17. A system comprising:
a plurality of computing devices, each computing device having at least one processor and at least one memory, wherein the memory of the plurality of computing devices include instructions for execution by the at least one processor, including instructions to:
receive a HTTP request from a web browser executing on a client device for static image content, the static image content within a static image file identified by a static image identifier,
transcode the requested static image content into a video compression file using a type of video compression, the video compression including a video compression signature, and
transmit the video compression file to the client device in response to the request for static image content; and
wherein the client device recognizes that the video compression file is encoded using a type of video compression by examining a plurality of bytes within the static image compression file.

18. The system of claim 17, wherein the instructions to receive the HTTP request from the web browser are included in a web server application stored in the memory of a first computing device of the plurality of computing devices, the web server application configured to be executed by the at least one processor of the first computing device, and wherein the instructions to transcode the requested static image content into a video compression file are included in a recompression service application stored in the memory of a second computing device of the plurality of computing devices, the recompression service application configured to be executed by the at least one processor of the second computing device.

19. The system of claim 18, wherein the recompression service includes a transcoder configured to transcode the requested static image content, wherein the transcoder is a keyframe encoder, the keyframe encoder having capability limited to encoding a video keyframe.

20. The system of claim 17, wherein a client application executed by the client device receives the transmitted video compression file, decodes the video compression file based on the recognized type of video compression to obtain static image data, recompresses the static image data using a type of static image compression, and transmits the recompressed static image data to the web browser.

* * * * *